(12) United States Patent
Miner

(10) Patent No.: US 7,101,431 B2
(45) Date of Patent: Sep. 5, 2006

(54) PERIODICALLY POLED POTASSIUM TITANYL PHOSPHATE CRYSTAL

(75) Inventor: Carla Miner, Carp (CA)

(73) Assignee: Picarro, Inc., Sunnyvale, CA (US)

( * ) Notice: Subject to any disclaimer, the term of this patent is extended or adjusted under 35 U.S.C. 154(b) by 213 days.

(21) Appl. No.: 10/910,045

(22) Filed: Aug. 3, 2004

(65) Prior Publication Data

US 2005/0006630 A1   Jan. 13, 2005

Related U.S. Application Data

(63) Continuation-in-part of application No. 10/349,379, filed on Jan. 21, 2003, now Pat. No. 6,982,999.

(51) Int. Cl.
*C30B 1/10* (2006.01)

(52) U.S. Cl. .................. 117/2; 117/3; 117/4; 117/8; 117/940

(58) Field of Classification Search .............. 117/2, 117/3, 4, 8, 940
See application file for complete search history.

(56) References Cited

U.S. PATENT DOCUMENTS

| | | | |
|---|---|---|---|
| 5,986,798 A * | 11/1999 | Karlsson et al. | 359/326 |
| 6,597,492 B1 * | 7/2003 | Rosenman et al. | 359/326 |
| 6,763,042 B1 * | 7/2004 | Williams et al. | 372/6 |
| 2002/0171912 A1 * | 11/2002 | Masuda | 359/326 |
| 2003/0112835 A1 * | 6/2003 | Williams et al. | 372/6 |
| 2006/0045455 A1 * | 3/2006 | Giesber, III | 385/129 |

\* cited by examiner

*Primary Examiner*—Robert Kunemund
(74) *Attorney, Agent, or Firm*—Lumen Intellectual Property Services, Inc.

(57) ABSTRACT

A thermal treatment process for improving the resistance of a flux grown, periodically poled $KTiOPO_4$ crystal to photorefractive or photochromic damage comprising the steps of:
 i) heating said crystal from ambient temperature up to an annealing temperature in the range of from about 200° C. to about 400° C.;
 ii) maintaining said crystal at said annealing temperature in an oxygen containing atmosphere;
 iii) allowing said crystal to slowly cool down from said annealing temperature to ambient temperature.

6 Claims, 4 Drawing Sheets input lens                                    output lens

PERIODICALLY POLED POTASSIUM TITANYL PHOSPHATE CRYSTAL

FIELD OF THE INVENTION

This invention relates to a thermal treatment process for improving the resistance of a flux grown PPKTP (periodically poled potassium titanyl phosphate, $KTiOPO_4$) crystal to photo refractive damage and photo chromic damage when subjected to U.V., I.R. and/or visible light.

BACKGROUND OF THE INVENTION

The production of visible light ($\lambda=400-700$ nm) by means of second- harmonic generation in non-linear optical crystals is a known process. A preferred approach is to use a non-linear material which has been periodically poled. In this technique, the inherent wavelength conversion efficiency of the non-linear crystal is enhanced by imposing a periodic reversal in the orientation of the polarization of the crystal along the direction of light propagation. Potassium Titanyl Phosphate (KTP) is one non-linear crystalline material which is used in a number of applications in non-linear optics, including second- harmonic generation. For example, periodically poled potassium titanyl phosphate (PPKTP) has been used in the frequency doubling of near-infrared laser light to produce visible blue light. See, for example, WIPO Application No. 98/36109 for a detailed description of a method for transforming a crystal of KTP into (PPKTP) in order to permit quasi phase matching, which enhances conversion efficiency. Several workers with KTP have reported that, when used in frequency doubling, or other optical processes where UV, IR and/or visible light is transmitted for extended periods of time through a PPKTP crystal, whether grown by the older hydrothermal technique or by the currently preferred flux method, the crystal is subject to damage in service. Apparently this damage is caused by either or both of the input light (generally IR) and the output light (generally in the visible range or UV range) which results from the frequency doubling.

When used for frequency doubling, a variety of specific problems with the PPKTP crystal have been encountered, including photorefractive damage as manifested by:

i) changes in the size, shape and/or waist position of the frequency doubled beam and also beam astigmatism, and
ii) a decline in the frequency doubled (second harmonic) beam spatial mode quality.
iii) A change in the temperature at which second harmonic generation is optimal. This temperature is known as the phase matching temperature.

I will hereafter refer to these three effects as BSE for Beam Shift Effect.

Another problem is photochromic damage, one visible aspect of which is called "gray tracking", which term is used to describe the appearance of discolored regions in the crystal. Gray tracking may be a visible indicia of increased absorption, which effect can significantly reduce the crystal's conversion efficiency and hence the laser's power output. Although the cause of photochromic damage is almost certainly not limited to the effect of the blue or other visible wavelength output light, we refer to this phenomenon as BIA for Blue Induced Absorption. This effect may also be due at least in part to the infrared pump beam which is being frequency doubled to produce the visible output light. If we consider the case of using a 976 nm IR pump laser to generate frequency doubled 488 nm blue light, the consequence of BIA is that the output power of the 976 nm gain chip has to be continuously increased over the operating life of the laser to compensate for the increased absorption (and hence reduced output) of the blue light by the PPKTP crystal. Compensation can be achieved by increasing the pump current to the gain chip, however, there is an upper limit beyond which the gain chip current cannot be safely raised without risking sudden chip failure.

It is by no means clear whether both BIA and BSE result from the same change or changes occurring in the crystal itself, but both effects are believed to occur as a result of the passage through the crystal of the pump and/or frequency doubled radiation for a prolonged period.

Over the past twenty years, a number of prior artworkers have endeavored to understand and/or solve the performance problems associated with the use of KTP and especially PPKTP for frequency conversion and other optical processes. The approaches have involved varying the crystal formation conditions, and/or treatment of the KTP crystal. To date, none of these approaches have proved wholly successful.

It seems clear that part of the problem prior artworkers have encountered in solving the KTP and PPKTP crystal degradation problem has been disagreement as to the mechanism, or more likely mechanisms, involved in such degradation. See, for example, "Nuclear Instruments and Methods in Physics Research" B, 141, pp 472–476 (1998); and J. Appl. Physics 87, 12, pp 8682–8687 (2000). At least some of the prior artworkers have postulated that the damage susceptibility of the PPKTP is due to deviation from stoichiometry (i.e., Potassium ion vacancies) in the crystal lattice. Hence, early workers tried annealing the crystal at the very high temperatures at which there would presumably be some mobility on the part of atoms present in the crystal lattice, in an effort to achieve a more uniform stoichiometry throughout the crystal. Other workers have investigated the effect of potassium non-stoichiometry on the crystal Curie temperature after high temperature (970° C.) heating in air, Appl. Phys. Lett. 67 (13) pp 1941–1943 (1995). Heating a KTP crystal in dry oxygen at 800° C., prior to poling to form PPKTP, has been reported to increase absorption at a wavelength of 500 nm., J. Appl. Phys. 73 (7), 2705 (1992), but conversely, heating in a wet Oxygen atmosphere at 800° C. is said to provide an improved crystal. Still other workers have suggested that synthesis of KTP in an Oxygen atmosphere affords a crystal having a stronger second-harmonic generation (SHG) signal, Solid State Comm. 91, 9, pp 757–759 (1994). However, later workers reported an improvement in transmission in the range 400–550 nm by growing the KTP crystals in an oxygen deficient ambient atmosphere, Appl. Phys. Lett. 69,(8) pp 1032–1034 (1996). The following review article describes much of the currently published literature on KTP and PPKTP: M. N. Satyanarayan, A. N. Deepthy and H. L. Bhat "Potassium Titanyl Phosphate and Its Isomorphs: Growth, Properties, and Applications", Critical Reviews in Solid State and Materials Sciences, 24, 2, (1999), pp 103–189.

The extensive studies of KTP and/or PPKTP, only a few of which have been referred to above, while doubtless of scientific interest, have not provided a viable procedure for providing a KTP crystal and, in particular, a PPKTP crystal, which has a significantly reduced tendency to develop one or more of the previously enumerated problems, e.g., gray tracking, astigmatism, and other beam quality degradation when subjected to optical radiation for an extended period of service.

BRIEF DESCRIPTION OF THE INVENTION

I have found that thermal treatment (annealing) of flux grown PPKTP under a narrow range of thermal conditions significantly improves the resistance of the thus treated PPKTP crystals to the previously described deleterious photochromic and photorefractive defect formation. While the present invention will be described and exemplified primarily in the context of the conversion of near infrared light to blue visible light it is to be understood that when carrying out frequency conversion by a PPKTP crystal, the wavelength of the frequency doubled output light can be varied by an appropriate choice of input light wavelength and the size of the crystal grating period.

DETAILED DESCRIPTION OF THE INVENTION

As previously indicated, in service the PPKTP frequency doubling crystal is known to undergo a variety of harmful changes in its performance characteristics over time. Among these changes are ones we refer to as Blue Induced Absorption (BIA) and Beam Shift Effect (BSE). Although it has not been definitely established, there is some evidence that both BIA and BSE are caused by the same or at least related changes which occur in the PPKTP crystal during operation, and that a treatment to the crystal that cures or at least ameliorates one condition will tend to ameliorate the other.

Considering first BSE, many users of blue lasers have very specific requirements for the optical beam parameters at the output of the laser, e.g., for beam waist diameter (650–750 μm) and waist location (±200 mm from the laser output window). When the PPKTP crystal undergoes changes over its operational life the beam waist will tend to decrease in diameter and move away from the laser output window. For many users these changes are not acceptable. These changes are illustrated in FIGS. 1 and 2 for an untreated crystal.

Figure 1:
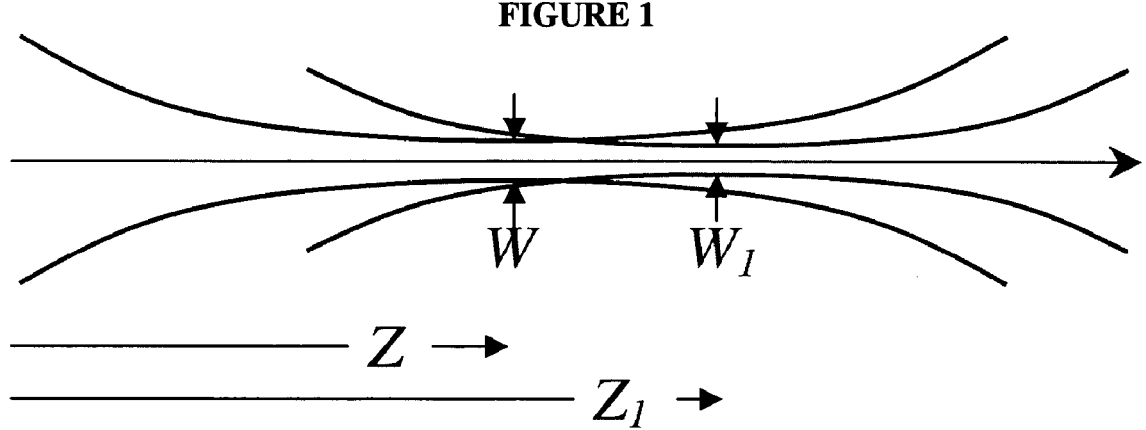
FIG. 1 shows the Beam Shift Effect in that the beam waist shrinks and the beam waist position moves away from the source.

FIG. 1 shows the waist position and beam size Z and W respectively, at the start of service. As indicated above, in use the waist size will shrink and its position will tend to shift away from the laser output lens to $W_1$ and $Z_1$, respectively. This effect is also illustrated in FIG. 2 which shows the effect of the BSE where the beam waist both shrinks and moves away from the laser output lens.

Figure 3:
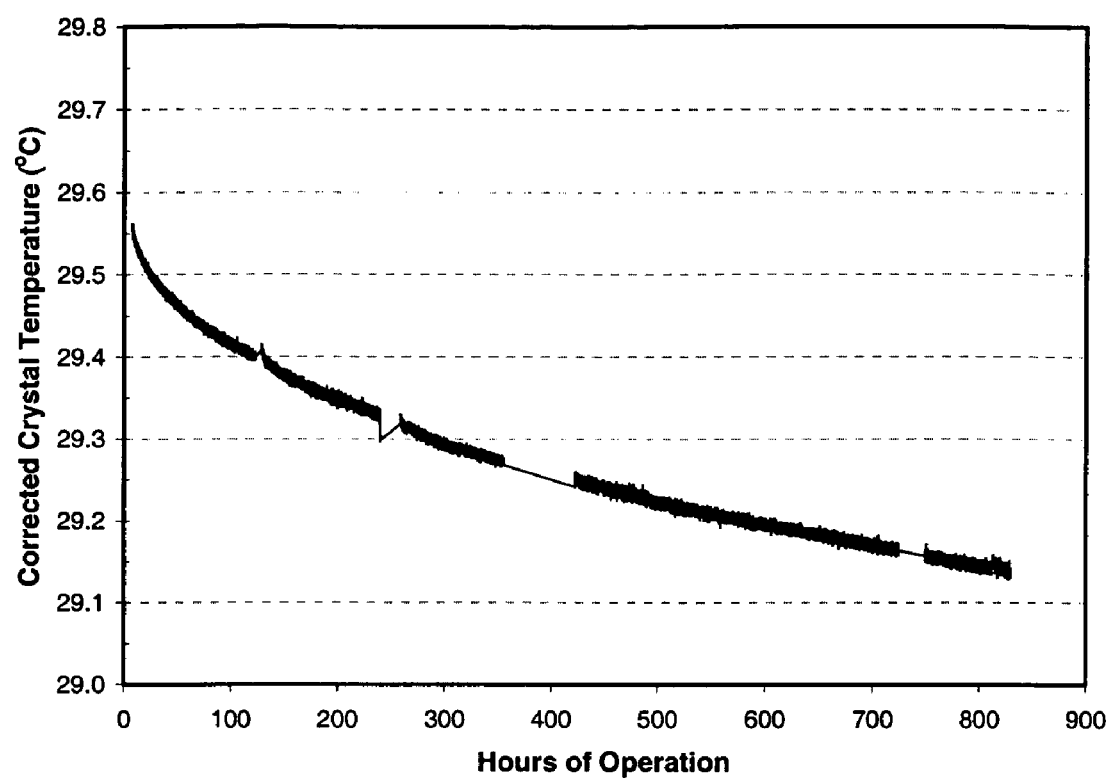
FIG. 3 shows the need to monitor and adjust the crystal operating temperature of a PPKTP crystal which has not been treated in accordance with the present invention to maintain optimum phase matching efficiency.

As already indicated, another BSE effect appears to be that the optimum phase matching temperature changes slightly. This results in either a loss in conversion efficiency and/or the need to provide means to both monitor the phase matching and also to adjust the temperature of the PPKTP crystal over its service life. This effect is illustrated in FIG. 3, where to maintain optimum conversion efficiency for a PPKTP crystal over an 800 hour period of operation it was necessary to reduce the crystal temperature by 0.5° C. This imposes a non-trivial burden on the design of the laser.

Figure 2:
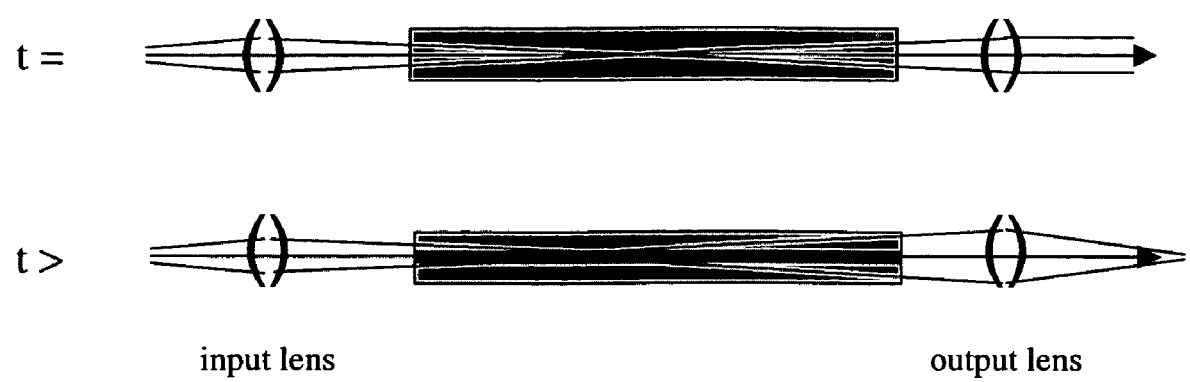
FIG. 2 shows the same effect by illustrating the change in beam configuration over time.

We have found that all of the effects illustrated in FIGS. 1–3 are eliminated or, at least substantially ameliorated when the PPKTP crystal is treated in accordance with the present invention.

Figure 4:
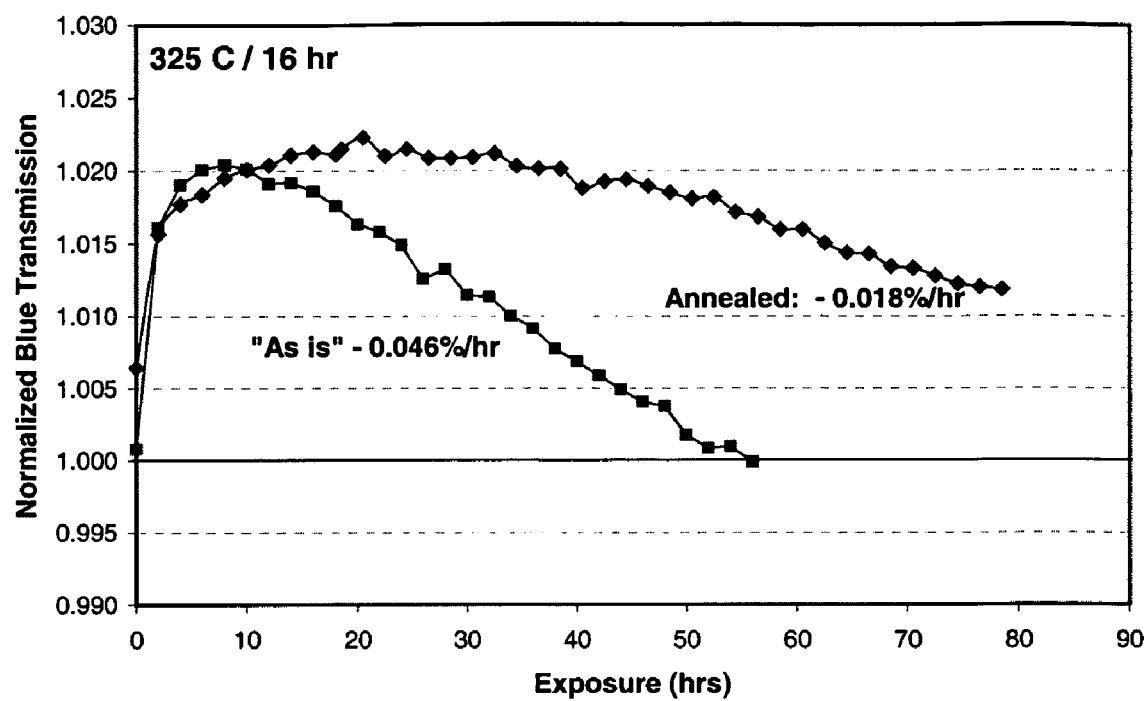
FIG. 4 compares the transmission of an untreated ("as is") PPKTP crystal to a crystal that has been thermally treated (annealed) in accordance with the present invention.

Another problem we have found to occur over the service life of the PPKTP crystal is the previously mentioned blue induced absorption (BIA). As previously discussed, this term is used to indicate the tendency of the PPKTP crystal over time to absorb an increasing percentage of the blue light generated by frequency doubling. Since the user of the laser requires a certain level of power output, such a BIA induced reduction in output over time may reduce the laser power output to an unacceptable level. BIA is usually, although not always, manifested by the appearance of so called "gray tracking" which denotes areas of darkening in the crystal. FIG. 4 illustrates the increased absorption (reduction in transmission) of an untreated ("as is") PPKTP crystal in comparison with a PPKTP crystal annealed in accordance with the present invention at 325° C. for 16 hours. The pump laser in both cases was a semiconductor diode laser emitting at 976 nm. As can be seen, both crystals show an approximately the same initial transmissivity (normalized as 1.00). The transmissivity for each crystal then rises slightly in the first few hours of operation. However, the transmissivity of the untreated crystal almost immediately thereafter starts to decline steadily. In contrast, transmission by the PPKTP crystal, annealed in accordance with the present invention, decreases only very gradually over a prolonged period and even after 80 hours is still above its initial value. The point to be noted is that the "as is" (untreated) crystal has a steadily and significantly declining output of about 0.05%/hr. The crystal treated in accordance with the present invention shows a blue (frequency doubled wavelength) transmission decline at less than half that rate.

Four parameters define the boundaries of the novel process of the present invention in terms of providing a PPKTP crystal having improved resistance to both BSE and BIA. The process consists of annealing the PPKTP crystal where the following four parameters are kept within the hereinafter indicated ranges:

i) temperature range within which the PPKTP crystal is maintained during the annealing process;
ii) duration at the annealing period;
iii) composition of the atmosphere surrounding the crystal during annealing; and
iv) rate at which the crystal is brought up to annealing temperature from ambient temperature (normally about 25° C.) and then back down to ambient temperature following annealing.

Discussing the above-indicated parameters in sequence we have found that:

i) the annealing temperature should be in the range of from about 200° C. up to about 400° C. Annealing at a temperature below 200° C. has been found not to produce a significant improvement in resistance within a reasonable time span to either photorefractive or photochromic damage. Conversely, annealing at a temperature above about 400° C., while effective at reducing photochromic defect formation, is undesirable in that it has been found to cause degradation in second-harmonic generation performance. Note that it is not critical that the annealing temperature be maintained absolutely constant during the annealing process;

ii) to be fully effective, the annealing must be carried out for at least about 2 hours. Annealing for longer than about 60 hours is not deleterious particularly at the lower temperatures within the above-indicated range, but produces no significant additional performance enhancements for the crystal. Preferably the annealing time ranges from about 12 to about 48 hours;

iii) we have found that the annealing atmosphere must contain at least 10% oxygen. Ambient air (ca. 21% $O_2$) has been found suitable and is clearly the most convenient annealing atmosphere. Providing an oxygen rich atmosphere (i.e. greater than 21% $O_2$) may reduce the anneal time required to produce the same degree of improvement in crystal performance, but at the cost of complicating the process. It does not appear that the moisture content of the annealing atmosphere has a significant positive or negative effect; and iv) to maintain good second-harmonic generation performance, while still improving the crystals resistance to damage, it is important that the heat-up and cool-down from and to ambient temperature, respectively, be relatively slow. I have found that it is important that the thermal ramp-up and ramp-down rates, which can be the same or different, be no greater than about 10° C./minute, preferably less than 10° C./minute. Heating at a rate of 15° C./minute has been found to cause substantial, thermally induced depoling of the PPKTP crystal. The minimum ramp rate, up and/or down, does not appear to be critical and is determined by practical considerations in the sense of the time required to carry out the annealing process.

To a certain extent, the lower the annealing temperature within the range 200° C. to 400° C., the longer the anneal time required to result in the same level of improvement in resistance to BIA and BSE. Conversely, it is undesirable to anneal for an extended period of time at temperatures in the range of about 360° C. to 400° C. as this tends to reduce the efficiency of second harmonic generation, although it does seem to reduce the tendency to BIA. I have found that optimum results are obtained by annealing at a temperature of from about 270° C. up to about 330° C. for a period of from at least about 12 hours up to about 60 hours and with a temperature ramp rate (both up and down) of from about 0.5° C. to about 5.0° C. per minute.

The foregoing detailed description of the invention includes passages that are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure or embodiment, such feature can also be used, to the extent appropriate, in the context of another figure or embodiment, in combination with another feature, or in the invention in general. Further, while the present invention has been particularly described in terms of certain preferred embodiments, the invention is not limited to such preferred embodiments. Rather, the scope of the invention is defined by the appended claims.

The invention claimed is:

1. A thermal treatment process for improving the resistance of a flux grown, periodically poled $KTiOPO_4$ crystal to photorefractive or photochromic damage comprising the steps of:
   i) heating said crystal from ambient temperature up to an annealing temperature T wherein T is in the range of from about 200° C. to about 400° C.;
   ii) maintaining said crystal at said annealing temperature range for a period of at least about 2 hours in an annealing atmosphere comprising at least 10% oxygen;
   iii) allowing said crystal to cool down from said annealing temperature range to ambient temperature
wherein said heating rate and said cool down rates, which can be the same or different, are less than about 10° C. per minute.

2. A process in accordance with claim 1 wherein said temperature T ranges from about 270° C. up to about 330° C.

3. A process in accordance with claim 1 wherein said period ranges from about 12 to about 48 hours.

4. A process in accordance with claim 1 wherein said annealing atmosphere comprises ambient air.

5. A process in accordance with claim 1 wherein said heating rate and said cooling rate are independently less than about 5° C. per minute.

6. A flux grown, periodically poled $KTiOPO_4$ crystal which has been thermally treated in accordance with the process of claim 1.

* * * * *